United States Patent [19]

Hart

[11] 4,043,604
[45] Aug. 23, 1977

[54] EMERGENCY PORTION FOR A BRAKE CONTROL VALVE

[75] Inventor: James E. Hart, Trafford, Pa.

[73] Assignee: Westinghouse Air Brake Company, Wilmerding, Pa.

[21] Appl. No.: 740,837

[22] Filed: Nov. 11, 1976

[51] Int. Cl.² .............................................. B60T 15/18
[52] U.S. Cl. ........................................ 303/33; 303/42; 303/80
[58] Field of Search ........................ 303/36, 35, 80, 85, 303/66, 67, 37–39, 81–83, 86, 33, 42, 46

[56] References Cited

U.S. PATENT DOCUMENTS

| 2,087,623 | 7/1937 | Canetta et al. | 303/42 |
| 2,106,491 | 1/1938 | Sexton | 303/46 |
| 3,232,678 | 2/1966 | Wilson | 303/80 |
| 3,734,575 | 5/1973 | Paginton | 303/81 X |
| 3,967,864 | 7/1976 | McEathron | 303/81 |

Primary Examiner—Trygve M. Blix
Assistant Examiner—Douglas C. Butler
Attorney, Agent, or Firm—W. F. Poore; R. W. McIntire, Jr.

[57] ABSTRACT

A railway freight car brake control valve device comprises a novel emergency valve portion that embodies therein a plurality of simple and inexpensive diaphragm-type valves certain of which are subject on their respective opposite sides to brake pipe pressure and quick action chamber pressure. The construction and arrangement of these diaphragm-type valves are such that a service rate of reduction of brake pipe pressure enables flow of fluid under pressure from the quick action chamber to the brake pipe at a service rate, and an emergency rate of reduction of brake pipe pressure enables one of these diaphragm-type valves to effect the supply of fluid under pressure from the quick action chamber to a brake pipe vent valve device the resulting operation of which vents fluid under pressure from the brake pipe to atmosphere at an emergency rate to thereby cause an emergency brake application.

10 Claims, 3 Drawing Figures

EMERGENCY PORTION FOR A BRAKE CONTROL VALVE

BACKGROUND OF THE INVENTION

In U.S. Pat. No. 3,232,678 issued Feb. 1, 1966 to William G. Wilson, and assigned to the assignee of the present application, there is shown and described a brake control valve device that is substantially the same in function and operation as the brake control valve device included in the standard fluid pressure brake apparatus now in use on railway freight cars owned and operated by American railroads.

The brake control valve device shown in the above-mentioned U.S. Pat. No. 3,232,678 comprises a service valve portion embodying therein a plurality of slide, spool and disc-type valves, and an emergency valve portion that has a slide-type emergency valve slidable on a flat ported valve seat and a graduating valve slidably mounted on a flat ported surface provided therefor on the side of the emergency slide valve opposite the side thereof that engages the flat ported valve seat. This emergency valve portion is operative in response to a service rate of reduction of pressure in a train brake pipe to release fluid under pressure from a quick action chamber to atmosphere at a service rate thereby rendering this emergency valve portion effective to cause an emergency brake application only in response to an emergency rate of reduction of pressure in the train brake pipe.

The manufacture and production of these slide-type valves and valve seats of this emergency valve portion requires considerable accurate and skillful machining which, as is readily apparent, increases the cost of the emergency valve portion of which they are an essential component.

Accordingly, it is the general purpose of this invention to provide a railway car brake control valve device with a novel emergency valve portion that embodies therein a plurality of simple and inexpensive poppet valves of the diaphragm type that are subject opposingly to the pressure of fluid in the train brake pipe and in a quick action chamber, and are operative in response to a service rate of reduction of pressure in the train brake pipe to vent fluid under pressure from the quick action chamber to the train brake pipe at a service rate thereby preventing operation of this emergency valve portion to cause an emergency brake application until the rate of release of fluid under pressure from the train brake pipe is increased to that of an emergency rate.

SUMMARY OF THE INVENTION

According to the present invention, a railway freight car brake control valve device that includes a service valve portion and a pipe bracket that are substantially the same as the service valve portion and pipe bracket shown in the above-mentioned U.S. Pat. No. 3,232,678, and a novel emergency valve portion which is secured to this pipe bracket whereby there is provided a brake control valve device the novel emergency valve portion of which embodies a plurality of poppet valves of the diphragm type that are subject opposingly on their respective opposite sides to the pressure of fluid in a train brake pipe and in a quick action chamber normally charged to the normal fully charged pressure carried in the train brake pipe.

The construction and arrangement of these diaphragm-type valves are such that this emergency valve portion is operative, in response to a reduction of pressure in the train brake pipe at a service rate, to vent fluid under pressure from the quick action chamber to the train brake pipe at this service rate to thereby prevent the operation of this emergency valve portion to cause an emergency brake application. This emergency valve portion also comprises a novel valve mechanism whereby, in response to an emergency rate of reduction of the pressure in the train brake pipe, fluid under pressure is supplied from an emergency reservoir to a brake cylinder in addition to that supplied from an auxiliary reservoir to this cylinder by the service valve portion of the brake control valve device, and fluid under pressure is released locally at this control valve device from the train brake pipe to atmosphere at an emergency rate.

DESCRIPTION

Figure 1A:
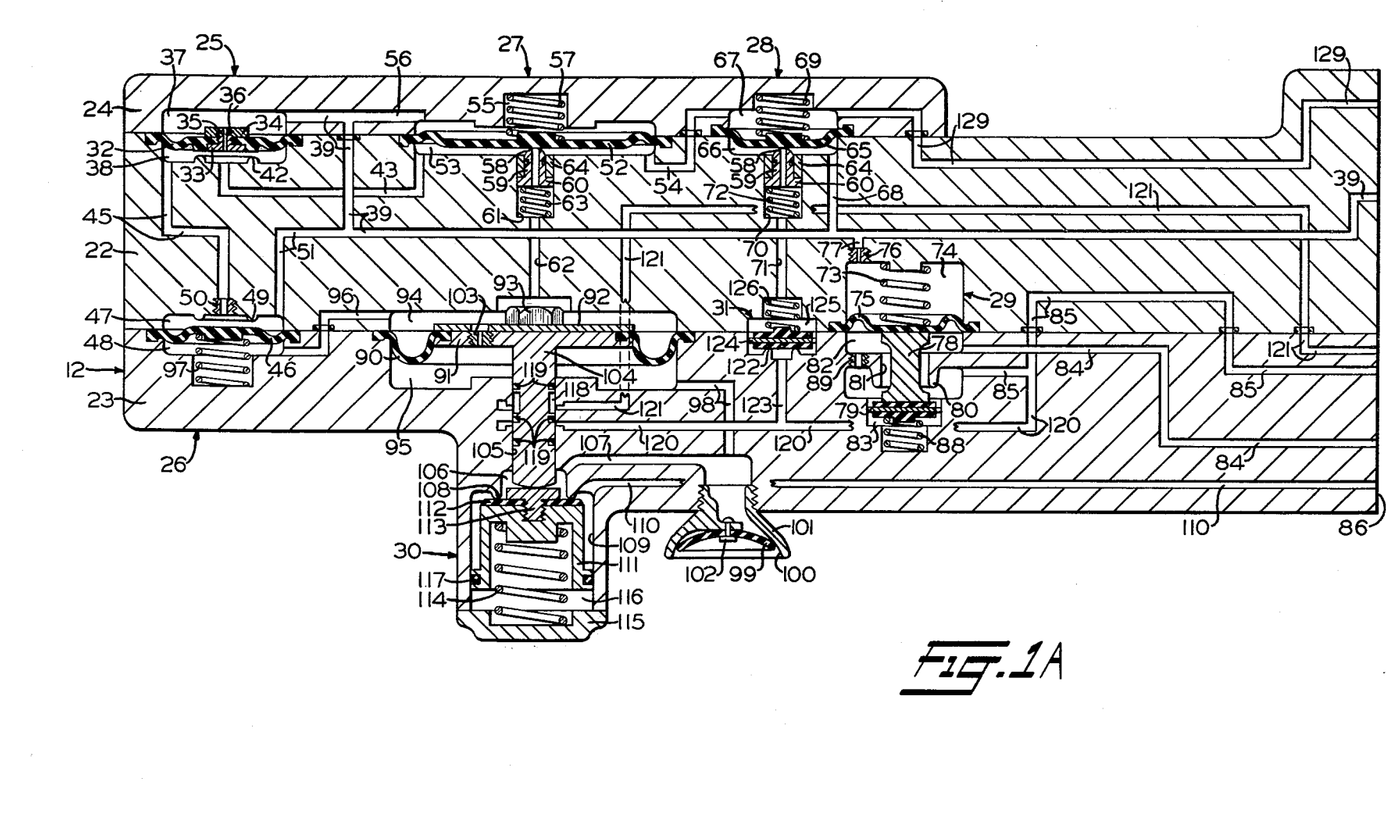
FIG. 1A and FIG. 1B, taken together, constitute a diagrammatic view, in section, of an improved brake control valve device embodying the invention.
Figure 1B:
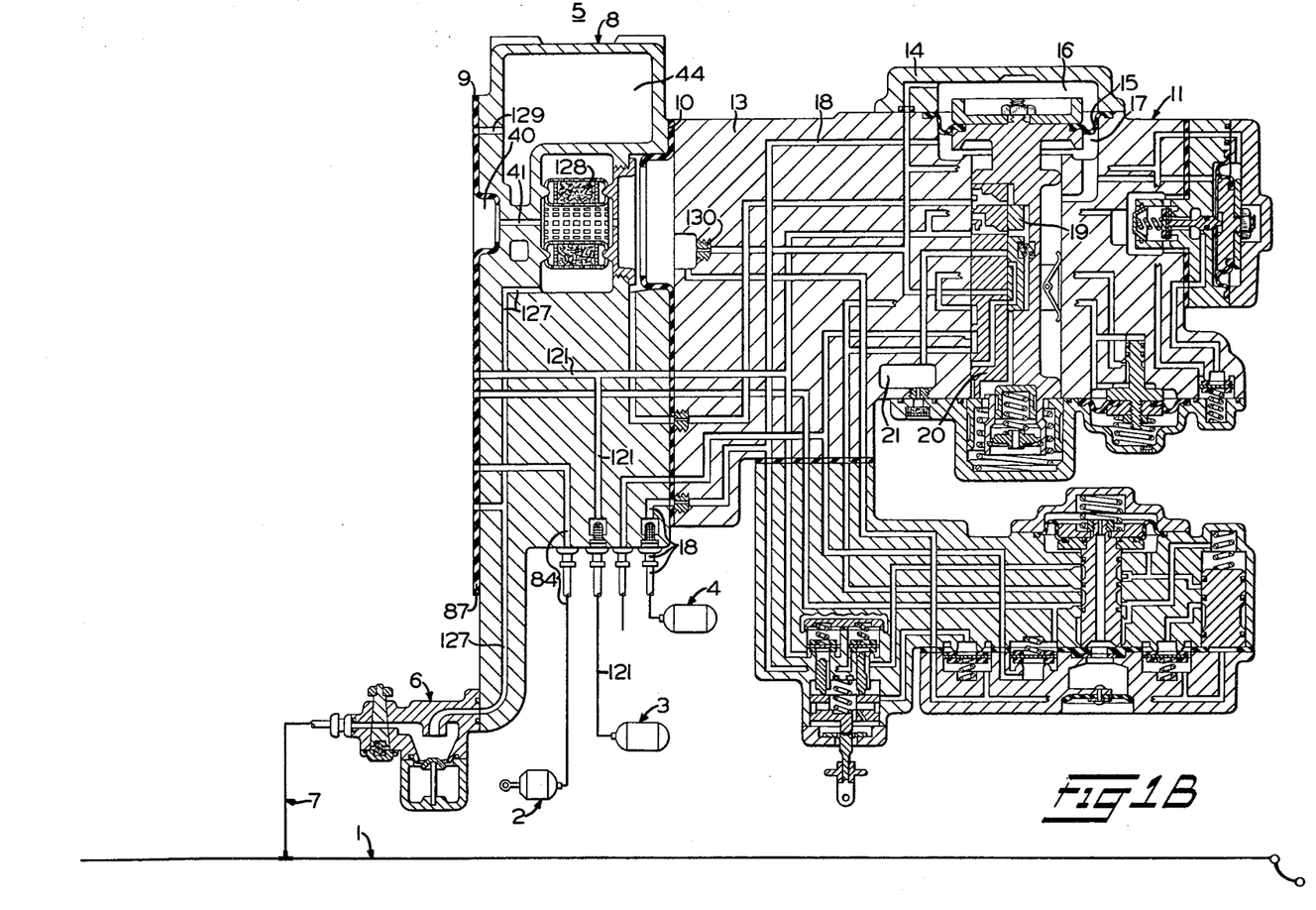

As shown in FIGS. 1A and 1B of the drawings, when the right-hand edge of FIG. 1A is placed along side of the left-hand edge of FIG. 1B, an improved freight car fluid pressure brake apparatus embodying the invention comprises a brake pipe 1 that extends from one end of the car to the other, a brake cylinder 2, an emergency or supplemental reservoir 3, an auxiliary reservoir 4, and a brake control valve device 5 connected to the brake pipe 1 through a combined cut-out cock and centrifugal dirt collector 6 and a branch pipe 7.

The brake control valve device 5 may comprise a pipe bracket 8 having gasket faces 9 and 10 disposed opposite each other, a service or triple valve device or portion 11 and a novel emergency valve device or portion 12.

The service valve portion 11 and pipe bracket 8 shown in FIG. 1B of the drawings may be substantially the same in construction and operation as the service valve portion 7 and pipe bracket 6 shown and described in the above-mentioned U.S. Pat. No. 3,232,678. Since reference may be had to this patent for a complete description of the structure and operation of this service valve portion and pipe bracket, it is deemed unnecessary to describe them in detail herein. Briefly, however, the service valve portion 11 comprises a sectionalized casing 13 between which and a cover member 14, secured thereto by any suitable means (not shown), is clamped the outer periphery of a diaphragm 15 subject opposingly on its opposite sides to brake pipe pressure in a chamber 16 at the upper side of this diaphragm 15, and to the pressure in the auxiliary reservoir 4 connected to a chamber 17 at the lower side of this diaphragm 15 by a pipe and correspondingly numbered passageway 18 that extends through the pipe bracket 8 and the sectionalized casing 13. Operatively connected to the diaphragm 15 is a service graduating valve 19 and service slide valve 20 for respectively controlling the release of fluid under pressure from the brake pipe 1 to a quick service volume 21 and the supply of fluid under pressure from the auxiliary reservoir 4 to the brake cylinder 2 in response to variations in brake pipe pressure, as disclosed in the abovementioned U.S. Pat. No. 3,232,678.

The novel emergency portion 12 shown in FIG. 1A of the drawings has a sectionalized casing comprising an upper casing section 22, a lower casing section 23 secured thereto by any suitable means (not shown), and a top cover member 24 that is secured to the casing section 22 by any suitable means (not shown).

As shown in FIG. 1A of the drawings, the emergency valve portion 12 comprises a quick action chamber charging valve device 25, a quick action chamber cut-off valve device 26, an emergency application valve device 27, an emergency accelerated release valve device 28, an inshot valve device 29, a combined emergency and brake pipe vent valve device 30, and an emergency accelerated release check valve device 31.

The quick action chamber charging valve device 25 comprises an annular resilient diaphragm-type valve 32 that has its outer periphery clamped between the upper casing section 22 and the top cover member 24.

The inner periphery of the diaphragm valve 32 is clamped between a diaphragm follower plate 33 and a nut 34 that has screw-threaded engagement with external screw threads which are provided on a stem 35 that is integral with the upper side of the follower plate 33 and extends through the diaphragm valve 32. Extending through the stem 35 and follower plate 33 is a small bore that constitutes a choke 36.

The choke 36 controls the rate of flow of fluid under pressure from a chamber 37 formed by the cooperative relationship of the diaphragm valve 32 and the top cover member 24 to a chamber 38 formed by the cooperative relationship of this diaphragm valve 32 and the casing section 22.

As shown in FIG. 1A, opening into the chamber 37 above the diaphragm valve 32 is one end of a passageway 39 that extends through the cover member 24 and casing section 22 and at its other end opens into a chamber 40 (FIG. 1B) formed in the pipe bracket 8. Also, opening into the chamber 40 is one end of a passageway 41 that is connected to the brake pipe 1 in the manner described in the hereinbefore-mentioned U.S. Pat. No. 3,232,678.

As may be seen from FIG. 1A, the choke 36 restricts the flow of fluid under pressure from the chamber 37 to the chamber 38. Therefore, upon the initial supply of fluid under pressure from the train brake pipe to the chamber 37, the diaphragm valve 32 will be deflected downward into engagement with an annular valve seat 42 that is formed on the casing section 22 at one end of a passageway 43 that is connected in a manner hereinafter made apparent to a quick action chamber 44 (FIG. 1B) formed in pipe bracket 8. From the foregoing, it is apparent that the quick action chamber 44 is charged with fluid under pressure from the brake pipe 1 via the choke 36 (FIG. 1A) which in actual practice or, in other words, in heretofore constructed railway freight car brake control valve devices, has a diameter of 0.0200 inch.

As shown in FIG. 1A, one end of a passageway 45 opens into the chamber 38 on the outside of the annular valve seat 42. This passageway 45 extends through the casing section 22 to the quick action chamber cut-off valve device 26.

The quick action chamber cut-off valve device 26 comprises a normally unseated annular resilient diaphragm-type valve 46 that has its outer periphery clamped between the casing sections 22 and 23. This diaphragm valve 46 cooperates with these casing sections 22 and 23 to form on the respective opposite sides of this diaphragm valve a pair of chambers 47 and 48.

Opening into the chamber 47 within an annular valve seat 49 formed on the casing section 22 is the other end of the passageway 45 in which is disposed a quick action chamber breather choke 50. It has been determined by experiment that the diameter of this choke 50 should be 0.1285 inch in order that fluid under pressure may flow from the quick action chamber 44 to the brake pipe 1 at a rate that will prevent operation of the emergency valve device 12 to effect an undesired emergency brake application while the pressure in the brake pipe 1 is being reduced at a service rate to cause a service brake application.

Also, opening into the chamber 47 on the outside of the annular valve seat 49 is one end of a passageway 51 that extends through the casing section 22 and at its other end opens into the hereinbefore-mentioned passageway 39 that is connected to the brake pipe 1. It is apparent that, upon a reduction of the pressure in the train brake pipe at a service rate, this passageway 51 enables fluid under pressure to flow from the quick action chamber 44 (FIG. 1B) to the brake pipe 1 via the choke 50 (FIG. 1A) at a rate dependent upon the diameter of this choke 50. As hereinbefore stated, it has been determined by experiment that the diameter of choke 50 should be 0.1285 inch.

The emergency application valve device 27 comprises an annular resilient diaphragm-type valve 52 that has its outer periphery clamped between the casing section 22 and the top cover member 24. This diaphragm valve 52 cooperates with the casing section 22 to form on the lower side of this diaphragm valve a chamber 53 into which opens the other end of the hereinbefore-mentioned passageway 43 and also one end of a passageway 54.

Furthermore, the diaphragm valve 52 cooperates with the top cover member 24 to form on the upper side of this diaphragm valve a chamber 55 into which opens one end of a passageway 56 that extends through this top cover member 24 and at its opposite end opens into the passageway 39 intermediate the ends thereof.

Disposed in the chamber 55 and interposed between the top cover member 24 and the upper side of the diaphragm valve 52 is a light spring 57 that acts in a downward direction to bias the lower side of this diaphragm valve 52 into engagement with an annular valve seat 58 that is formed at the upper end of a movable hollow cylindrical member 59.

Since the diaphragm valve 52 is constructed of a resilient material, such as, for example, rubber, and the cylindrical member 59 and the valve seat 58 thereon are constructed of metal, such as, for example, steel, in order to prevent damage to the diaphragm valve 52, the lower end of the cylindrical member 59 is provided with an out-turned flange 60 the diameter of which is such as to provide a sliding fit with a counterbore 61 that is coaxial with a bore 62 that extends through the casing section 22. A spring 63 disposed in the counterbore 61 is interposed between the bottom of this counterbore 61 and the flange 60 which is normally biased thereby against the lower end of a bushing 64 that is pressed into the upper end of the counterbore 61 subsequent to placing the spring 63 and the cylindrical member 59 in this counterbore 61 with the out-turned flange 60 on the lower end of this member 59 in abutting relation with the upper end of the spring 63.

As hereinbefore stated, fluid under pressure flows from the quick action chamber 44 (FIG. 1B) to the brake pipe 1 via the choke 50 while the pressure in the brake pipe 1 is being reduced at a service rate to cause a service brake application. It is well known that when fluid under pressure flows through a choke the pressure on the upstream side of the choke is greater than the pressure on the downstream side. Therefore, while fluid under pressure is flowing through the choke 50 to the brake pipe 1, the quick action chamber pressure in the chamber 53 below the diaphragm valve 52 is greater than brake pipe pressure in the chamber 55.

The area within valve seat 58 is normally open to atmosphere via the combined emergency and brake pipe vent valve device 30 in a manner hereinafter made apparent. Accordingly, the effective area of the upper side of the diaphragm valve 52, which is subject to brake pipe pressure, is greater than the effective area of the lower side of this diaphragm valve, this difference being determined by the area of the valve seat 58.

By experiment it has been found that when the pressure in a train brake pipe normally charged to a pressure of 70 pounds per square inch, which is the minimum brake pipe pressure used on American railroads, is reduced at a service rate to effect a service brake application, and the fluid under pressure in the quick action chamber 44 (FIG. 1B) is vented into the train brake pipe via the choke 50, the maximum difference between the pressure in the train brake pipe and the pressure in the quick action chamber 44 occurs when the pressure in the train brake pipe has been reduced from 70 pounds per square inch to 63 pounds per square inch.

Also, by experiment it has been found that when the pressure in a train brake pipe normally charged to a pressure of 110 pounds per square inch, which is the maximum normal fully charged train brake pipe pressure used on American railroads, is reduced at a service rate, the maximum difference between train brake pipe pressure and the quick action chamber pressure occurs when the train brake pipe pressure has been reduced to 100 pounds per square inch.

Now, if the value of the light spring 57 is selected to be one pound, the area of the upper side of the diaphragm valve 52 is selected to be 4.00 square inches, and the area of the valve seat 58 is selected to be 0.064 square inches, then it can be shown mathmatically that a pressure differential of 1.25 pounds per square inch between quick action chamber pressure and a train brake pipe pressure of 63 pounds per square inch is required to provide a force balance or equal forces acting on the respective opposite sides of the diaphragm valve 52.

Furthermore, it can be shown mathmatically that a pressure differential of 1.95 pounds per square inch between quick action chamber pressure and a train brake pipe pressure of 100 pounds per square inch is required to provide equal forces acting on the respective opposite sides of the diaphragm valve 52.

From the foregoing, it is apparent that the pressure differential between quick action chamber pressure and the train brake pipe pressure required to provide equal forces acting on the respective opposite sides of the diaphragm valve 52 increases as the pressure carried in the train brake pipe is increased. This increasing pressure differential between quick action chamber pressure and brake pipe pressure is required to insure proper distinction between service and emergency rates of brake pipe pressure reductions when the fluid under pressure in the quick action chamber is dissipated or vented into the brake pipe via the choke 50.

The emergency accelerated release valve device 28 comprises an annular resilient diaphragm-type valve 65 that has its outer periphery clamped between the casing section 22 and the top cover member 24. This diaphragm valve 65 cooperates with the casing section 22 and top cover member 24 to form on the respective opposite sides of this diaphragm valve 65 a pair of chambers 66 and 67. Opening into the chamber 66 is one end of a passageway 68 that extends through the casing section 22 and at its opposite end opens into the hereinbefore-mentioned passageway 39 that is connected to the brake pipe 1, and opening into the chamber 67 is the other end of the hereinbefore-mentioned passageway 54.

Disposed in the chamber 67 and interposed between the top cover member 24 and the upper side of the diaphragm valve 65 is a spring 69 that acts in a downward direction to force the lower side of this diaphragm valve 65 into engagement with an annular valve seat that may be identical to the annular valve seat 58 and is, therefore, denoted by the same numeral. The cylindrical valve member 59, on the upper end of which the valve seat 58 is formed, has a sliding fit with a second bushing 64 that is pressed into the upper end of a counterbore 70 that is coaxial with a bore 71 extending through the casing section 22. It should be understood that a spring 72 and the cylindrical member 59 are placed in the counterbore 70 prior to pressing the second bushing 64 into the upper end of this counterbore 70. Accordingly, it is apparent that the spring 72, which is interposed between the flange 60 on the lower end of cylindrical member 59 and the bottom of the counterbore 70, is normally effective to bias the valve seat 58 upward against the lower side of the diaphragm valve 65 which is subject on its upper side to the force of the spring 69 which must be lighter than the spring 72.

The inshot valve device 29 may be substantially the same as the inshot valve mechanism 52 shown and described in U.S. Pat. No. 2,106,491 issued Jan. 25, 1938 to Everette P. Sexton and assigned to the assignee of the present invention. This inshot valve device 29 shown in FIG. 1A of the drawings in the present application differs from the inshot valve mechanism 52 shown in U.S. Pat. No. 2,106,491 by the addition of a spring 73 disposed in a chamber 74 above a diaphragm 75 and a choke 76 disposed in a passageway 77 that at one end opens into the chamber 74 and at its other end opens into the hereinbefore-mentioned passageway 39 that is connected to the brake pipe 1.

Briefly, the force of the spring 73 and brake pipe pressure in the chamber 74 acting on the diaphragm 75 is normally effective, via a fluted stem 78 to unseat a disc valve 79 from an annular valve seat 80 formed at the lower end of a bore 81.

While the valve 79 is unseated from the seat 80, the bore 81 provides an unrestricted communication between a chamber 82 below the diaphragm 75 and a chamber 83 in which is disposed the disc valve 79. The chamber 82 is connected to the brake cylinder 2 (FIG. 1B) by a passageway and correspondingly numbered pipe 84. Opening into the chamber 83 is one end of a passageway 85 that extends through the casing section 22 to a gasket face 86 formed on the right-hand end of the casing section 22. A ported gasket 87 is disposed between the gasket face 86 on the casing section 22 and the gasket face 9 (FIG. 1B) on the pipe bracket 8. Consequently, one of the ports in this gasket 87 establishes a communication between the passageway 85 in the casing section 22 and a passageway in the pipe bracket 8 that corresponds to the passageway 72 shown in the hereinbefore-mentioned United States Patent. As explained in this patent, fluid under pressure is supplied from the auxiliary reservoir 2 (in the patent) to this passageway 72 (in the patent) whenever a service brake application is effected. Accordingly, it is apparent that, likewise, fluid under pressure is supplied from the auxiliary reservoir 4 (FIG. 1B) to the passageway 85 (FIG. 1A) and thence to the chamber 82 via the bore 81 by operation of the service portion 11 (FIG. 1B) in response to a reduction of the pressure in the brake pipe 1 at a service rate. Since the chamber 82 is connected to the brake cylinder 2 (FIG. 1B) by the passageway and pipe 84, when the brake cylinder pressure in the chamber 82 (FIG. 1A) is built up sufficiently to deflect the diaphragm 75 upward against the yielding resistance of the spring 73 and the brake pipe pressure in the chamber 74, a spring 88 is rendered effective to seat valve 79 on its seat 80 whereupon further flow of fluid under pressure to the brake cylinder 2 is at a restricted rate determined by the size of a choke 89 that provides a bypass communication between the chambers 83 and 82 while the valve 79 is seated on its seat 80. In actual practice, as in heretofore constructed railway freight car brake control valve devices, the choke 89 has a diameter of 0.09375 inch.

The combined emergency and brake pipe vent valve device 30 comprises an annular diaphragm 90 the outer periphery of which is clamped between the casing sections 22 and 23. The inner periphery of this diaphragm 90 is clamped between a diaphragm follower 91 and an annular diaphragm follower plate 92 by a nut 93 that has screw-threaded engagement with external screw threads provided therefor on a stem that is integral with the upper side of the diaphragm follower 91 and extends through the annular diaphragm follower plate 92.

The diaphragm 90 cooperates with the casing sections 22 and 23 to form on the respective opposite sides of this diaphragm 90 a pair of chambers 94 and 95.

Opening into the chamber 94 is the lower end of the bore 62 and one end of a passageway 96 that extends through the casing sections 22 and 23 and at its other end opens into the hereinbefore-mentioned chamber 48 below the diaphragm valve 46 between the lower side of which and the casing section 23 is interposed a spring 97.

The chamber 95 is open to atmosphere via a passageway 98 that extends through the lower casing section 23 and past a dished circular shield 99.

The shield 99 is preferably formed of a resilient material, such as rubber, and is held in place, in which its outer periphery rests against a conical inner surface 100 on an insect excluder device 101, by any suitable means, such as, for example, a rivet 102 that extends through a bore in this insect excluder device.

As shown in FIG. 1A, the diaphragm follower plate 91 carries a choke 103 that provides a restricted communication between the chambers 94 and 95 and on its lower side is integral with a spool-type valve 104 that slidably extends through a bore 105 in the casing section 23. This bore 105 opens at its upper end into the chamber 95 and at its lower end within an annular chamber 106 into which opens one end of a passageway 107. This passageway 107 extends through the casing section 23 and at its opposite end opens into the passageway 98.

Formed on the casing section 23 and in surrounding relation to the lower end of the chamber 106 is an annular valve seat 108 that is coaxial with a counterbore 109 in the casing section 23. Opening into the upper end of this counterbore 109 is one end of a passageway 110 that extends through the casing section 23 to the gasket face 86 on this casing section where it registers with a port in the ported gasket 87 (FIG. 1B). This port in the gasket 87 establishes a communication between the passageway 110 in the casing section 23 and a passageway in the pipe bracket 8 that corresponds to the passageway 37 shown in the hereinbefore-mentioned U.S. Pat. No. 3,232,678. As shown in FIG. 1 of this patent, fluid under pressure is supplied from the brake pipe to this passageway 37 (in the patent). Accordingly, it is apparent that fluid under pressure is supplied from the brake pipe 1 to the passageway 110 (FIG. 1B) and the counterbore 109.

As shown in FIG. 1A, slidably mounted in the counterbore 109 is a cup-shaped vent valve guide 111 to which a vent valve 112 constructed of some resilient material, such as, for example, rubber, is clamped by a cap screw 113. The vent valve 112 is normally biased against the valve seat 108 by a spring 114 that is interposed between the vent valve guide 111 and a lower cover member 115 that is secured by any suitable means (not shown) to the lower end of the casing section 23.

In order to prevent flow of fluid under pressure from the passageway 110 and counterbore 109 to a chamber 116, the vent valve guide 111 is provided with a peripheral annular groove in which is disposed an O-ring seal 117 that forms a seal with the wall surface of the counterbore 109.

It will be noted from FIG. 1A that the lower end of the spool valve 104 abuts the head of the cap screw 113 and that intermediate its ends this spool valve is provided with an elongated peripheral annular groove 118 above which is a peripheral annular groove in which is carried an O-ring seal 119 and below which is a pair of spaced-apart peripheral annular grooves in each of which is carried an O-ring seal 119.

It will be further noted that, while the spool valve 104 occupies the position in which it is shown in FIG. 1A, the two lower O-ring seals 119 carried on this valve 104 form a seal with the wall surface of the bore 105 at locations that are respectively above and below the location at which one end of a passageway 120 opens at this wall surface. This passageway 120 extends through the casing section 23 and opens into the passageway 85 intermediate the ends thereof.

Moreover, while the spool valve 104 occupies the position shown in FIG. 1A, the upper and center O-ring seals 119 carried on this valve 104 form a seal with the wall surface of the bore 105 at locations that are respectively above and below the location at which one end of a passageway 121 opens at this wall surface. As shown in FIGS. 1A and 1B, this passageway 121 extends through the casing sections 23 and 22 and pipe bracket 8 and is connected by a correspondingly numbered pipe to the emergency reservoir 3.

As shown in FIG. 1A, the emergency accelerated release check valve device 31 comprises an annular valve seat 122 that surrounds one end of a passageway 123 that extends through the casing section 23 and at its opposite end opens into the passageway 120 intermediate the ends thereof. This check valve device 31 further comprises a disc-type valve 124 that is disposed in a chamber 125 formed between the casing sections 22 and 23 and a spring 126 also disposed in this chamber 125 and interposed between the casing section 22 and the valve 124 to normally bias this valve against its seat 122 to close communication between the passageway 123 and the chamber 125 into which opens the lower end of the bore 71.

OPERATION

In the development of the emergency portion 12 of the railway freight car brake control valve device 5 constituting the present invention, tests were made, using a number of different train brake pipe pressures, to determine the pressure in the train brake pipe at the time the maximum difference between quick action chamber pressure and train brake pipe pressure occurred when effecting a reduction in the train brake pipe pressure at both a service rate and also at an emergency rate.

Figure 2:
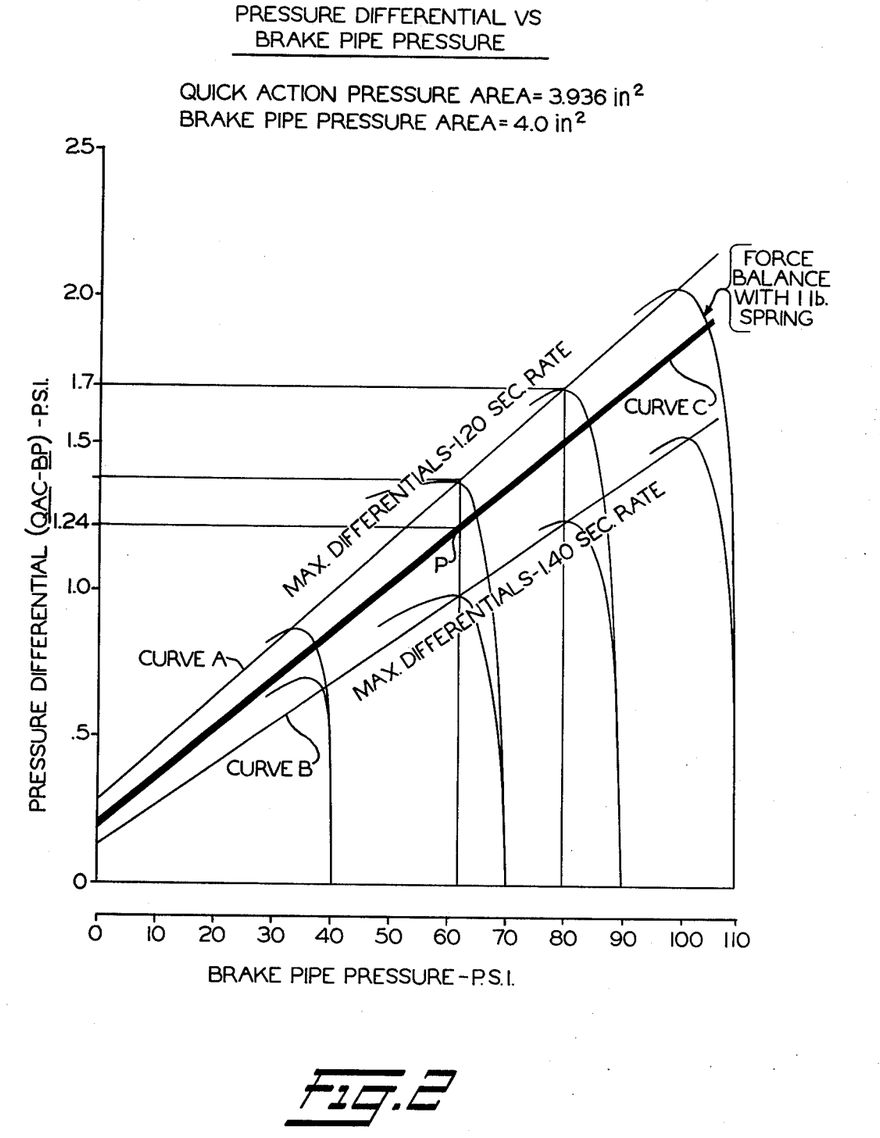
FIG. 2 is a graph showing the functional design parameters of the present invention.

The curve marked A in FIG. 2 shows, for a plurality of different normally charged train brake pipe pressures, the pressure in the train brake pipe at the time the maximum difference between quick action chamber pressure and brake pipe pressure occurred, together with this difference in pressure when the pressure in the train brake pipe was reduced at the rate specified by the Association of American Railroads as the minimum rate at which a freight car brake control valve device will operate to effect an emergency brake application.

The curve marked B in FIG. 2 shows, for a plurality of different normally charged train brake pipe pressures, the pressure in the train brake pipe at the time the maximum difference between quick action chamber pressure and brake pipe pressure occurred, together with this difference in pressure when the pressure in the train brake pipe was reduced at the rate specified by the Association of American Railroads as the maximum rate at which a freight car brake control valve device will operate to effect a service brake application, it being understood that if the reduction in brake pipe pressure is greater than this specified rate, the brake control valve device will operate to effect an emergency brake application.

The curve marked P in FIG. 2 shows, for a plurality of different normally charged train brake pressures, the pressure in the train brake pipe pressure and the difference in the pressure in the quick action chamber and the pressure in the train brake pipe at the time the fluid pressure force acting in an upward direction on the diaphragm valve 52 (FIG. 1A), as the result of the quick action chamber pressure acting on the effective area of the lower side of this diaphragm valve 52 on the outside of the valve seat 58, is equal to the fluid pressure force acting in a downward direction on this diaphragm valve 52, as the result of the brake pipe pressure acting on the entire effective area of the upper side of the diaphragm valve 52, it being understood that the effective area of the diaphragm valve 52 has been selected to be 4.000 square inches, the area of the valve seat 58 to be 0.064 square inch, and the force of the spring 57 to be one pound, as hereinbefore stated.

From the foregoing, it is apparent that if the difference in the force resulting from the fluid under pressure in the quick action chamber 44 and the chamber 53 and the sum of the forces resulting from the fluid under pressure in the brake pipe 1 and chamber 55 and the force of the spring 57 is greater than that at which equal and opposite forces are obtained on the opposite sides of the diaphragm valve 52, the fluid pressure force acting upward on the effective area of the lower side of the diaphragm valve 52 on the outside of the valve seat 58 will deflect this diaphragm valve 52 upward thereby unseating it from the valve seat 58 whereupon fluid under pressure present in the chamber 53 and the quick action chamber 44 (FIG. 1B) will flow to the chamber 94 (FIG. 1A) of the combined emergency and brake pipe vent valve device 30 via hollow cylindrical member 59, counterbore 61, and bore 612. This supply of fluid under pressure to the chamber 94 will cause the combined emergency and brake pipe vent valve device 30 to operate in a manner hereinafter described in detail to cause an emergency brake application.

However, so long as the difference in the force resulting from the fluid under pressure in the quick action chamber 44 and the chamber 53 and the sum of the forces resulting from the fluid under pressure in the brake pipe 1 and chamber 55 and the force of the spring 57 is equal to or less than that at which equal and opposite forces are obtained on the opposite sides of this diaphragm 52, this diaphragm valve 52 will not be unseated from the valve seat 58 to effect the supply of fluid under pressure to the chamber 94 to cause the valve device 30 to operate to effect an emergency brake application.

Initial Charging

Let it be assumed that a railway freight car provided with the brake control valve device 5 shown in FIGS. 1A and 1B of the drawings has been coupled into a train of cars, and that a handle of an engineer's brake valve device (not shown) located on the locomotive coupled to the head end of the train is in its release position. Therefore, while the handle of the engineer's brake valve device is in its release position, this brake valve device will effect the supply of fluid under pressure to the train brake pipe and therefore to the brake pipe 1 to charge the train brake pipe to a preselected normal charged value which, for example, may be seventy pounds per square inch.

Fluid under pressure supplied to the brake pipe 1 will flow via the branch pipe 7 (FIG. 1B) and combined cut-out cock and dirt collector 6 to the brake control valve device 5 to cause the service valve portion 11 of this control valve device 5 to operate in the usual well-known manner of railway freight car brake control valves to effect a release of fluid under pressure from the brake cylinder 2 thereby releasing the brakes on the car and to charge the emergency reservoir 3 and auxiliary reservoir 4 to the pressure carried in the brake pipe 1.

Fluid under pressure supplied to the brake pipe 1 will flow therefrom through the branch pipe 7 and combined cut-out cock and dirt collector 6 to a passageway 127 in the pipe bracket 5 and thence from this passageway 127 to; (1) the counterbore 109 (FIG. 1A) via the passageway 110, (2) the chamber 37 via a strainer device 128 (FIG. 1B), passageway 41, chamber 40 and passageway 39 (FIG. 1A), (3) the chamber 47 from the passageway 39 via the passageway 51, (4) the chamber 55 from the passageway 39 via the passageway 56, (5) the chamber 66 from the passageway 39 via the passageway 68, and (6) the chamber 74 from the passageway 39 via the passageway 77 and choke 76 disposed therein.

Because of the restriction to flow of fluid under pressure through the choke 36, the fluid under pressure supplied to the chamber 37 will deflect the resilient diaphragm valve 32 downward into seating contact with the valve seat 42.

With the diaphragm valve 32 seated against the valve seat 42, fluid under pressure will flow from the chamber 37 at a restricted rate determined by the size of the choke 36 to the quick action chamber 44 (FIG. 1B) via this choke 36 (FIG. 1A), passageway 43, chamber 53, passageway 54, chamber 67 and a passageway 129 extending through the top cover member 24, casing section 22 and pipe bracket 8 (FIG. 1B) to effect charging of this chamber 44 to the normal pressure carried in the brake pipe 1.

Since the diaphragm valve 32 is constructed of a resilient material, upon the pressure in the chamber 44 (FIG. 1B) reaching that in the brake pipe 1, this diaphragm valve 32 will return to the unseated position in which it is shown in FIG. 1A.

Moreover, it is apparent that when the pressures in the chambers 55 and 53 become equal, the spring 57 is rendered effective to seat the diaphragm valve 52 on its valve seat 58. It is also apparent that when the pressures in the chambers 67 and 66 become equal, the spring 69 is rendered effective to seat the diaphragm valve 65 on its valve seat 58.

Assuming that no fluid under pressure is present in the brake cylinder 2 (FIG. 1B) at the time the freight car is coupled into the train, there is no flow of fluid under pressure from this brake cylinder 2 to the brake pipe 1 via the emergency accelerated release check valve device 31 and the emergency accelerated release valve device 28.

SERVICE APPLICATION

A service application of the brakes is initiated by effecting a gradual reduction in brake pipe pressure at a service rate in the usual well-known manner. The service portion 11 (FIG. 1B) of the brake control valve device 5 will operate in the usual manner of the service portion of heretofore known railway freight car brake control valve devices to effect the supply of fluid under pressure from the auxiliary reservoir 4 to the brake cylinder 2 to cause a service brake application on the freight car provided with this control valve device 5.

As the pressure in the brake pipe 1 is reduced at a service rate, the pressure in the chamber 47 (FIG. 1A) above the diaphragm valve 46 will be correspondingly reduced at a service rate.

Since the diaphragm valve 32 is now unseated from the valve seat 42 and the diaphragm valve 46 is unseated from the valve seat 49, fluid under pressure will flow from the quick action chamber 44 (FIG. 1B) to the brake pipe 1 via the chokes 36 (FIG. 1A) and 50 in parallel.

As hereinbefore stated, the diameter of the choke 36 is 0.0200 inch and the diameter of the choke 50 is 0.1285 inch. It has been found by experiment that when the diameter of the choke 36 is 0.0200 inch and the diameter of the choke 50 is 0.1285 inch, the rate of flow of fluid under pressure from the quick action chamber 44 to the brake pipe 1 via the chokes 36 and 50 in parallel is the same as the service rate of flow of fluid under pressure from the brake pipe 1 whenever a service brake application is effected by movement of the handle of the engineer's brake valve device on the locomotive from its release position to a position in its service application zone corresponding to the degree of pressure desired in the brake cylinder 2. Consequently, it is apparent that fluid under pressure is released from the quick action chamber 44 and the chambers 67, 53 and 38 into the brake pipe 1 via the chokes 36 and 50 in parallel at the same rate as fluid under pressure is released from the chambers 37, 47, 55 and 66 to atmosphere via the train brake pipe and the engineer's brake valve device. Consequently, no movement of any element of the emergency valve device 12 is effected upon the release of fluid under pressure from the train brake pipe at a service rate and, therefore, this emergency valve device 12 is thereby rendered inoperative to cause an emergency brake application.

SERVICE LAP

When the release of fluid under pressure from the train brake pipe is terminated, it is apparent that the release of fluid under pressure from the quick action chamber 44 (FIG. 1B) is likewise terminated.

When the release of fluid under pressure from the brake pipe 1 is terminated, the service valve device 11 will move to a lap position to cut off flow of fluid under pressure from the auxiliary reservoir 4 to the brake cylinder 2.

EMERGENCY APPLICATION

To effect an emergency application of the brakes, fluid under pressure is suddenly vented at a rapid rate from the brake pipe 1. Upon this reduction of pressure in the brake pipe 1, the service valve device 11 will operate to supply fluid under pressure from the auxiliary reservoir 4 (FIG. 1B) to the passageway 85 (FIG. 1A).

Moreover, the emergency valve device 12 operates in the manner explained above to release fluid under pressure from the chambers 67, 53 and 38 and quick action chamber 44 (FIG. 1B) into the brake pipe 1 via the chokes 36 and 50 in parallel. This rate of release of fluid under pressure from the chamber 53 below the diaphragm valve 52 is less than the emergency rate of release of fluid under pressure from the chamber 55 above this diaphragm valve 52 via the brake pipe 1.

Therefore, it is apparent that a differential of pressure is quickly established on the diaphragm valve 52 which acts in an upward direction to deflect this diaphragm valve 52 upward and thereby out of seating contact with its valve seat 58.

Upon this unseating of the diaphragm valve 52 from its seat 38, fluid under pressure will flow from the chamber 53 and the quick action chamber 44 (FIG. 1B) to the chamber 94 (FIG. 1A) in the combined emergency and brake pipe vent valve device 30 via the hollow cylindrical member 59, counterbore 61, and bore 62.

Since the choke 103 restricts the flow of fluid under pressure from the chamber 94 to atmosphere via the chamber 95, passageway 98 and past the resilient shield 99 of the insect excluder device 101, the pressure in the chamber 94 will increase to cause downward deflection of the diaphragm 90.

It is apparent from FIG. 1A that this downward deflection of the diaphragm 90 effects downward shifting of the spool valve 104 to unseat the vent valve 112 from its valve seat 108.

When the vent valve 112 is thus unseated from its seat 108, the brake pipe passageway 110 is open to atmosphere via chamber 106, passageways 107 and 98, and past shield 99. With this communication established, fluid under pressure is suddenly vented from the brake pipe 1 at an emergency rate for the purpose of serially transmitting an emergency rate of reduction of pressure in the train brake pipe extending through the train in the usual well-known manner.

As the spool valve 104 is further shifted downward, the groove 118 on this valve 104 establishes a communication between the passageways 121 and 120 whereupon fluid under pressure will flow from the emergency reservoir 3 (FIG. 1B) to the passageway 85 (FIG. 1A)

via pipe and passageway 121 (FIGS. 1B and 1A), groove 118 on spool valve 104 and passageway 120.

The fluid under pressure thus supplied to the passageway 85 from the emergency reservoir 4 combines with that supplied to this passageway 85 from the auxiliary reservoir 4 by operation of the service valve device 11 and flows therefrom to the chamber 83 in the inshot valve device 29.

Fluid under pressure thus supplied to the chamber 83 will flow therefrom to the chamber 82 via the bore 81 and choke 89 in parallel and thence from the chamber 82 to a pressure chamber (not shown) within the brake cylinder 2 (FIG. 1B) via the passageway and corresponding pipe 84.

The fluid under pressure thus supplied to the pressure chamber within cylinder 2 will act on one side of the piston (not shown) therein and move this piston outward against the yielding resistance of the brake cylinder release spring (not shown) that acts on the other side of this piston. As this piston is thus moved, it increases the volume of the pressure chamber to which fluid under pressure is being supplied from the chamber 82 (FIG. 1A). It is apparent that this increasing volume of the pressure chamber within the brake cylinder 2 (FIG. 1B) retards the rate of build up of pressure in this pressure chamber of increasing volume and also in the chamber 82 (FIG. 1A) below the diaphragm 75.

It will be noted that when an emergency brake application is made, all fluid under pressure is vented from the chamber 74 above the diaphragm 75. Therefore, as the pressure in the chamber 82 is increased, this diaphragm 75 is deflected upward against the yielding resistance of the spring 73 the strength of which is such that when the pressure in the pressure chamber within the brake cylinder 2 (FIG. 1B) has increased to fifteen pounds per square inch, the pressure in the chamber 82 (FIG. 1A) below the diaphragm 75 will be of sufficient value to deflect this diaphragm 75 in an upward direction until the spring 88 seats the valve 79 on the annular valve seat 80 thereby closing offf the rapid flow of fluid under pressure to the brake cylinder 2 by way of the annular valve seat 80. With the valve 79 thus seated on valve seat 80, fluid under pressure continues to flow from the chamber 83 to the brake cylinder 2 (FIG. 1B) via the choke 89 (FIG. 1A), chamber 82 and passageway and pipe 84 (FIG. 1B), the choke 89 forming a by-pass communication around the valve 79 which is now seated on the valve seat 80. The choke 89 provides for the second stage of increase in brake cylinder pressure at a slower rate. The pressure in the brake cylinder 2 will now continue to build up at this slower rate determined by the size of the choke 89 until equalization of the pressure in the auxiliary reservoir 4, emergency reservoir 3 and brake cylinder 2 occurs.

From the foregoing, it is apparent that the emergency valve device 12 of the brake control valve device 5 provides a two-stage buildup of pressure in the brake cylinder 2.

Since fluid under pressure is supplied from both the auxiliary reservoir 4 and the emergency reservoir 3 to the brake cylinder 2 when an emergency brake application is effected, it is apparent that a higher pressure is obtained in the brake cylinder 2 than is the case when a service brake application is effected.

It will be noted from FIG. 1A that some of the fluid under pressure supplied to the chamber 94 will flow therefrom to the chamber 48 below the diaphragm valve 46 via the passageway 96. The fluid under pressure thus supplied to the chamber 48 from the quick action chamber 44 (FIG. 1B) together with the force of the spring 97 overcomes the reducing fluid pressure force of the fluid under pressure from the train brake pipe present in the chamber 47 and deflects the diaphragm valve 46 upward into engagement with the valve seat 49 thereby cutting off flow of fluid under pressure from the quick action chamber 44 (FIG. 1B) to the brake pipe 1 via the choke 50 (FIG. 1A). Therefore, when an emergency brake application is effected, flow through the choke 50 is cut off and thereafter flow of fluid under pressure from the quick action chamber 44 to the brake pipe 1 can occur only via the small choke 36 the diameter of which, as hereinbefore stated, is .0200 inch. Thus, cutting off flow through the larger choke 50, the diameter of which, as hereinbefore stated, is 0.1285 inch, and limiting the flow of fluid under pressure from the quick action chamber 44 to the brake pipe 1 to flow through the smaller choke 36, acts to dam up pressure in the quick action chamber 44 and thereby hasten the operation of the emergency application valve device 27 and also the combined emergency and brake pipe vent valve device 30.

It should be noted that the size of the choke 103 in the combined emergency and brake pipe vent valve device 30 is such as to prevent the vent valve spring 114 from reseating the vent valve 112 on its seat 108 until a sufficient period of time has elapsed as is necessary for the emergency brake application to bring the train to a stop.

When all fluid under pressure is released from the quick action chamber 44 (FIG. 1B) and the brake pipe 1 and, therefore, from the chambers 38, 48, 53, 67, 94, 37, 47, 55 and 66 (FIG. 1A), the diaphragm valves 32, 46, and 52 and diaphragm 90 will return to the position shown in FIG. 1A.

RELEASE OF THE BRAKES AFTER AN EMERGENCY APPLICATION

To effect a release of the brakes after an emergency application, fluid under pressure is supplied to the brake pipe 1 from whence it flows to the chamber 37 above the diaphragm valve 32, the chamber 47 above the diaphragm valve 46, and the chamber 55 above the diaphragm valve 52.

Moreover, fluid under pressure flows from the brake pipe 1 to the chamber 16 (FIG. 1B) above the diphragm 15 in the service valve device 11 at a restricted rate determined by the size of a choke 130.

It will be noted from FIGS. 1A and 1B of the drawings that fluid under pressure flows at an unrestricted rate to the chambers 37, 47 and 55 in the emergency valve device 12 since there are no chokes in the passageways 127, 41 and 39.

Furthermore, it will be noted from FIG. 1A that the choke 36 restricts the rate of flow of fluid under pressure from the chambers 37 to the chamber 53 below the diaphragm valve 52 and the quick action chamber 44 (FIG. 1B) via passageways 43, 54 and 129. Accordingly, it is apparent that the pressure in the chamber 37 above the diaphragm valve 32 will increase more rapidly than will the pressure in the chamber 38 below this diaphragm valve 32.

Moreover, it is apparent that the more rapid rate of increase of pressure in the chamber 37 quickly establishes a fluid pressure differential force which is effective to deflect the diaphragm valve 32 downward, as viewed in FIG. 1A, into engagement with the valve seat 42 so that no fluid under pressure flows to passageway 45 and choke 50.

With the diaphragm valve 32 seated on its seat 42, fluid under pressure cannot flow from the passageway 39 to the passageway 43 via passageway 51, chamber 47, choke 50, passageway 45 and chamber 38. Therefore, all flow of fluid under pressure from the brake pipe 1 to the quick action chamber 44 (FIG. 1B) is via the choke 36.

Subsequent to the release of fluid under pressure from the chambers 48 and 94 to atmosphere via the choke 103, chamber 95, passageway 98 and past the shield 99 of insect excluder device 101, fluid under pressure supplied from the brake pipe 1 to passageways 39 and 51 will unseat diaphragm valve 46 from its seat 49 against the yielding resistance of spring 97, and the spring 114 will shift valve guide 111, vent valve 112, cap screw 113 and spool valve 104 upward to the position shown in FIG. 1A in which vent valve 112 is seated on its seat 108 and the groove 118 on the spool valve 104 cuts off communication between passageways 121 and 120 thereby disconnecting the emergency reservoir 3 (FIG. 1B) from the brake cylinder 2.

Upon the supply of fluid under pressure to the train brake pipe to effect a release of an emergency brake application, fluid under pressure will flow without restriction from brake pipe 1 to the chamber 66 below diaphragm valve 65 via branch pipe 7, combined cut-out cock and dirt collector 6, passageway 127, strainer device 128, passageway 41, chamber 40, passageway 39 and passageway 68. Simultaneously fluid under pressure will flow from the passageway 39 to the chamber 67 above diaphragm valve 65 via the choke 36, passageway 43, chamber 53, and passageway 54. Consequently, the pressure in the chamber 66 will increase more rapidly than the pressure in the chamber 67. Therefore, when this upwardly acting fluid pressure differential force is sufficient to overcome the resistance of the spring 69, the diaphragm valve 65 will be unseated from its seat 68.

When diphragm valve 65 is thus unseated from it seat 68, fluid under pressure will flow from the brake cylinder 2 (FIG. 1B), and the auxiliary reservoir 4 connected thereto via the service valve device 11 which is still in its service application position to the brake pipe 1 via pipe and passageway 84, chamber 82 (FIG. 1A), past valve seat 80 and through choke 89, chamber 83, passageways 85, 120 and 123, past valve seat 122, check valve 124 being unseated against the yielding resistance of the spring 126, chamber 125, passageway 71, counter-bore 70, hollow cylindrical valve member 59, past valve seat 58, chamber 66, passageways 68 and 39, chamber 40 (FIG. 1B), passageway 41, strainer device 128, the passageway 127 in the pipe bracket 8, combined cut-out cock and dirt collector 6 and branch pipe 7.

The above-mentioned flow of fluid under pressure from the brake cylinder 2 and the auxiliary reservoir 4 to the brake pipe 1 accelerates the rate of recharge of the brake pipe. This action naturally occurs first at the head end of the train when the increase in brake pipe pressure is first effected, and the sudden increase in brake pipe pressure on one car causes the emergency valve device on the next car to function in the same manner, so that this back dump operation is rapidly transmitted serially from car to car throughout the length of the train.

It will be noted from FIG. 1A that some of the fluid under pressure supplied from the brake cylinder 2 and the auxiliary reservoir 4 to the passageway 39, in the manner described above, flows from this passageway 39 to the chamber 37 above the diaphragm valve 32.

Moreover, fluid under pressure thus supplied to the chamber 37 flows therefrom to the quick action chamber 44 (FIG. 1B) via the choke 36, passageway 43, chamber 53, passageway 54, chamber 67 and passageway 129.

From the foregoing, it is apparent that fluid under pressure will flow from the brake cylinder 2 and auxiliary reservoir 4 to the brake pipe 1 until substantial equalization of pressures therebetween occurs, and also that fluid under pressure will flow through the choke 36 (FIG. 1) until the pressure in the chambers 53 and 67 and quick action chamber 44 (FIG. 1B) is substantially the same as the pressure in the chamber 66 and the brake pipe 1.

Upon equalization of pressure in chambers 37, 53, 55, 66 and 67, the inherent resilience of the diaphragm valves 32, 52, and 65 return these diaphragm valves to the position in which they are shown in FIG. 1A.

As the diaphragm valve 65 is thus moved downward to the position in which it is shown in FIG. 1A, the spring 69 is rendered effective to seat this diaphragm valve 65 on its seat 58 thereby closing communication between the brake cylinder 2 (FIG. 1B) and the brake pipe 1 and thus prevent further flow of fluid under pressure from the brake cylinder 2 to the brake pipe 1.

As fluid under pressure is supplied to the chamber 16 (FIG. 1B) in the manner described above, the resulting increase in pressure in this chamber 16 will deflect the diaphragm 15 downward to thereby return the graduating valve 19 and the service valve 20 of the service valve device 11 to the position shown. The fluid under pressure now remaining in the brake cylinder 2 will flow to atmosphere via pipe and passageway 84, chamber 82, past valve seat 80, choke 89 in parallel therewith, chamber 83, passageway 85, and passageways and ports in the service valve device 11 it being understood that these passageways and ports correspond to ports and passageways in the service valve device 7 of the brake control valve device 1 shown in hereinbefore-mentioned U.S. Pat. No. 3,232,678 through which fluid under pressure may flow from the brake cylinder 7 shown in this patent to atmosphere.

With the release of all fluid under pressure from the brake cylinder 2 (FIG. 1A), the brakes on the car will be completely released.

Furthermore, the emergency reservoir 3 and the auxiliary reservoir 4 will now be charged from the brake pipe 1 to the normal fully charged train brake pipe pressure.

Having now described the invention, what I claim as new and desire to secure by Letters Patent, is:

1. For use in a brake apparatus including a brake pipe, a quick action chamber, an auxiliary reservoir and an emergency reservoir each normally charged to a certain chosen pressure, a brake cylinder and a fluid-pressure-operated service valve device, a fluid-pressure-operated emergency valve device operative in conjunction with said service valve device in response to a reduction of the pressure in the brake pipe at an emergency rate to effect the supply of fluid under pressure from said reservoirs to said brake cylinder to cause an emergency brake application, said emergency valve device comprising:

a. a first restricted means enabling flow of fluid under pressure between the brake pipe and the quick action chamber to provide for charging the quick action chamber from the brake pipe, wherein the improvement comprises:

b. a second restricted means enabling flow of fluid under pressure between the brake pipe and the quick action chamber, said second means being so arranged with respect to said first means as to enable parallel flow of fluid under pressure between the quick action chamber and the brake pipe via said first and second restricted means, c. a valve seat interposed between said first and second restricted means, and d. a resilient valve member subject on its respective opposite sides to the pressure of the fluid in the brake pipe and in the quick action chamber and having said first restricted means so mounted thereon that, upon movement of said member into engagement with said valve seat in response to the pressure in the brake pipe exceeding that in the quick action chamber, flow of fluid under pressure between the brake pipe and the quick action chamber via said second restricted means is cut off so that, so long as the pressure in the brake pipe exceeds that in the quick action chamber, flow of fluid under pressure from the brake pipe to the quick action chamber is only via said first restricted means, said resilient valve member being movable out of engagement with said valve seat in response to equalization of the pressures on the respective opposite sides thereof thereby enabling flow of fluid under pressure from the quick action chamber to the brake pipe via said first and second restricted means in parallel in response to a reduction of pressure in the brake pipe.

2. The emergency valve device, as recited in claim 1, further characterized in that the size of said first and second restricted means is such that the rate of flow of fluid under pressure from the quick action chamber to the brake pipe via said first and second restricted means in parallel is equal to a service rate of flow of fluid under pressure from the brake pipe.

3. The emergency valve device, as recited in claim 1, further characterized in that said emergency valve device comprises:

a. a fluid-pressure-operated brake pipe vent valve device for releasing fluid under pressure from the brake pipe to atmosphere, and b. valve means operable only in response to an emergency rate of reduction of pressure in the brake pipe to effect the supply of fluid under pressure from the quick action chamber to said fluid-pressure-operated brake pipe vent valve device to cause the operation thereof.

4. The emergency valve device, as recited in claim 3, further characterized in that said valve means comprises:

a. an annular valve seat, and b. a valve element for engagement with said annular valve seat and subject on the side thereof adjacent said seat to the pressure in the quick action chamber and on the other side to the pressure in the brake pipe, the effective area of said valve element and the area of said annular seat being so selected that while said adjacent side of said valve element is subject to the maximum difference in the pressures in the quick action chamber and in the brake pipe obtained upon a reduction of pressure in the brake pipe from any chosen normally fully charged brake pipe pressure at a chosen rate, the fluid pressure forces acting on the effective areas of the respective opposite sides of said valve element are equal and act in opposite directions whereby a reduction of the pressure in the brake pipe at any rate in excess of said chosen rate effects unseating of said valve element from said annular valve seat to effect the supply of fluid under pressure from the quick action chamber to said fluid-pressure-operated brake pipe vent valve device to cause the operation thereof.

5. The emergency valve device, as recited in claim 1, further characterized in that said emergency valve device comprises:

a. an emergency accelerated release valve device operable in response to charging of the brake pipe subsequent to effecting an emergency brake application to enable flow of fluid under pressure from the brake cylinder to the brake pipe until equalization of pressure therebetween occurs, and b. a one-way flow means enabling flow of fluid under pressure in the direction from the brake cylinder to said emergency accelerated release valve device and preventing flow of fluid under pressure in an opposite direction.

6. The emergency valve device, as recited in claim 5, further characterized in that said emergency accelerated release valve device comprises:

a. an annular valve seat, b. a valve element for engagement with said annular valve seat and subject on the side thereof adjacent said seat to the pressure in the brake pipe and on the other side to the pressure in the quick action chamber, and c. biasing means disposed on said other side of said valve element for biasing said valve element into engagement with said annular valve seat in the absence of fluid under pressure in both the quick action chamber and in the brake pipe.

7. The emergency valve device, as recited in claim 1, further characterized by fluid-pressure-operated means operable to cut off flow of fluid under pressure between the brake pipe and the quick action chamber via said second restricted means.

8. The emergency valve device, as recited in claim 1, further characterized by valve means operable only in response to an emergency rate of reduction of pressure in the brake pipe to effect the supply of fluid under pressure from the emergency reservoir to the brake cylinder.

9. The emergency valve device, as recited in claim 1, further characterized in that said emergency valve device comprises:

a. a fluid-pressure-operated combined emergency and brake pipe vent valve device for simultaneously supplying fluid under pressure from the emergency reservoir to the brake cylinder and releasing fluid under pressure from the brake pipe to atmosphere at an emergency rate, and b. valve means operable only in response to an emergency rate of reduction of pressure in the brake pipe to effect the supply of fluid under pressure from the quick action chamber to said fluid-pressure-operated combined emergency and brake pipe vent valve device to cause the operation thereof.

10. The emergency valve device, as recited in claim 1, further characterized by an inshot valve device for providing a two-stage buildup of pressure in the brake cylinder.

* * * * *